United States Patent [19]
Lin

[11] Patent Number: 5,321,444
[45] Date of Patent: Jun. 14, 1994

[54] EYEGLASSES WITH A REPLACEABLE LENS UNIT

[75] Inventor: Victor Lin, Taipei, Taiwan

[73] Assignee: Mao Lin Enterprise Co., Ltd., Taipei, Taiwan

[21] Appl. No.: 74,416

[22] Filed: Jun. 10, 1993

[51] Int. Cl.⁵ .......................... G02C 1/06; G02C 5/02
[52] U.S. Cl. ........................................ 351/86; 351/41; 351/124; 351/130; 351/140
[58] Field of Search ........................ 351/41, 44, 47, 57, 351/58, 60, 83, 84, 85, 86, 90, 91, 94, 124, 125, 130, 140, 149, 158, 106

[56] References Cited

U.S. PATENT DOCUMENTS

| | | | |
|---|---|---|---|
| 4,402,577 | 9/1983 | Minart | 351/125 |
| 4,402,578 | 9/1983 | Minart | 351/140 |
| 4,521,090 | 6/1985 | Pierquin | 351/124 |
| 4,632,526 | 12/1986 | Lhospice | 351/124 |
| 4,685,782 | 8/1987 | Lhospice | 351/130 |
| 4,759,622 | 7/1988 | Schmidthaler | 351/86 |
| 5,007,727 | 4/1991 | Kahaney et al. | 351/57 X |

*Primary Examiner*—William L. Sikes
*Assistant Examiner*—David R. Parsons
*Attorney, Agent, or Firm*—Fitzpatrick, Cella Harper & Scinto

[57] ABSTRACT

A pair of eyeglasses includes an eyeglass frame and a lens unit mounted detachably on the eyeglass frame. The eyeglass frame includes a curved front frame with two downwardly projecting end portions, and two bows. The curved front frame has an engagement groove formed therein, and a retained portion disposed at the middle section of the curved front frame. The engagement groove has two end portions respectively extending into the front surfaces of the downwardly projecting end portions of the curved front frame. The lens unit includes two lenses and a plastic lens rim mounted securely on the lenses. The lens rim has a rib projecting upward from the upper end portion thereof so as to engage the engagement groove. The rib has two lugs projecting respectively and outwardly from two ends thereof and being inserted into the end portions of the engagement groove. A hook is fixed on the lens rim and has a retaining space formed therein so as to retain the retained portion of the curved front frame. Accordingly, when the hook is pushed upward away from the retained portion, the lugs of the rib can be disengaged from the end portions of the engagement groove.

1 Claim, 3 Drawing Sheets

EYEGLASSES WITH A REPLACEABLE LENS UNIT

BACKGROUND OF THIS INVENTION

1. Field of the Invention

This invention relates to a pair of eyeglasses, more particularly to a pair of eyeglasses with a replaceable lens unit which is able to be easily replaced with a new one.

2. Description of the Related Art

This invention is an improvement of a pair of conventional eyeglasses which includes an eyeglass frame and a pair of lenses. The eyeglass frame consists of a curved front frame and two bows which are respectively coupled with two ends of the front frame in a known manner. Because the lenses are mounted securely on the annular front frame of the eyeglass frame, when the wearer desires to change the lenses, a new pair of eyeglasses is needed to substitute therefor. This type of eyeglasses cannot satisfy the need of consumers from an economical standpoint.

SUMMARY OF THE INVENTION

The main objective of this invention is to provide a pair of eyeglasses with a replaceable lens unit which is able to be easily replaced with a new one.

According to this invention, a pair of eyeglasses consists of an eyeglass frame and a lens unit mounted detachably on the eyeglass frame. The eyeglass frame includes a curved front frame with two downwardly projecting end portions, and a pair of bows which are respectively coupled with the end portions of said curved front frame. The curved front frame has an engagement groove formed in the bottom surface thereof, and a retained portion disposed at the middle section of the curved front frame. The engagement groove has two end portions respectively extending into the front surfaces of the end portions of the curved front frame. The lens unit includes a pair of lenses and a lens rim mounted securely on the peripheral sections of the lenses. The lens rim is made of a plastic material and has an upwardly projecting rib projecting upward from the upper end portion thereof so as to engage the engagement groove of the curved front frame. A hook is fixed on the intermediate section of the lens rim. The upwardly projecting rib has two lugs that project respectively and outwardly from two ends thereof and that are inserted into the end portions of the engagement groove of the curved front frame of the eyeglass frame. The hook includes a vertical plate portion that is connected securely to the intermediate section of the lens rim and that is spaced apart from the upwardly projecting rib. A horizontal plate portion extends rearward from the upper end of the vertical plate portion. A retaining portion extends downward from the rear end of the horizontal plate portion so as to define a retaining space in the hook, thus retaining the retained portion of the curved front frame of the eyeglass frame in the retaining space of the hook.

Accordingly, when the retaining portion of the hook is pushed upward away from the eyeglass frame so as to remove the hook from the retained portion of the curved front frame, the lugs of the upwardly projecting rib can be disengaged from the end portions of the engagement groove of the curved front frame.

BRIEF DESCRIPTION OF THE DRAWING

Other features and advantages of this invention will become apparent from the following detailed description of a preferred embodiment of this invention, with reference to the accompanying drawings, in which.

DETAILED DESCRIPTION OF THE PREFERRED EMBODIMENT

Figure 1:
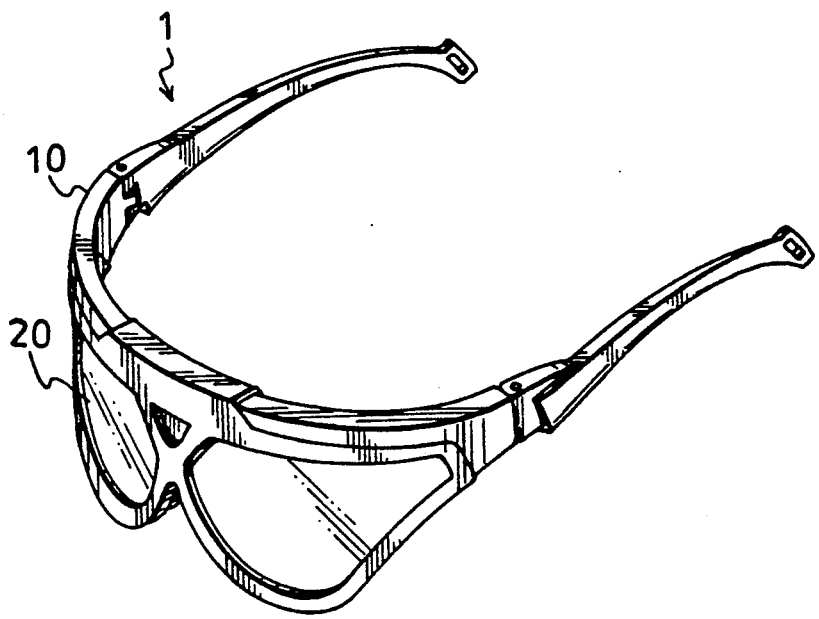
FIG. 1 is a perspective view of a pair of eyeglasses which consists of an eyeglass frame and a lens unit according to this invention.

Referring to FIG. 1, a pair of eyeglasses (1) of this invention consists of an eyeglass frame (10) and a lens unit (20). The lens unit (20) is detachably connected to the eyeglass frame (10).

Figure 2:
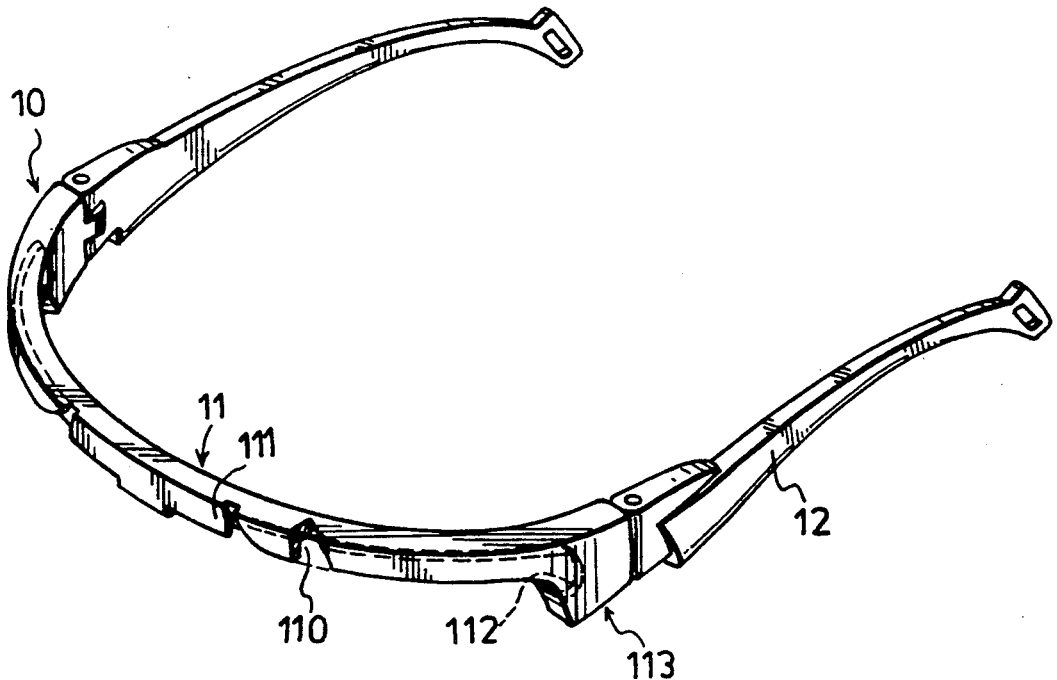
FIG. 2 is a perspective view showing the eyeglass frame of the eyeglasses in accordance with this invention.

Referring to FIG. 2, the eyeglass frame (10) includes a curved front frame (11) with two downwardly projecting end portions (113), and a pair of bows or side arms (12) which are respectively coupled with end portions (113) of the curved front frame (11) in a known manner. The curved front frame (11) has an engagement groove (110) formed in the bottom surface thereof, and a retained portion (111) disposed at the middle section of the curved front frame (11). The engagement groove (110) has two end portions (112) respectively extending into the front surfaces of the end portions (113) of the curved front frame (11).

Figure 3:
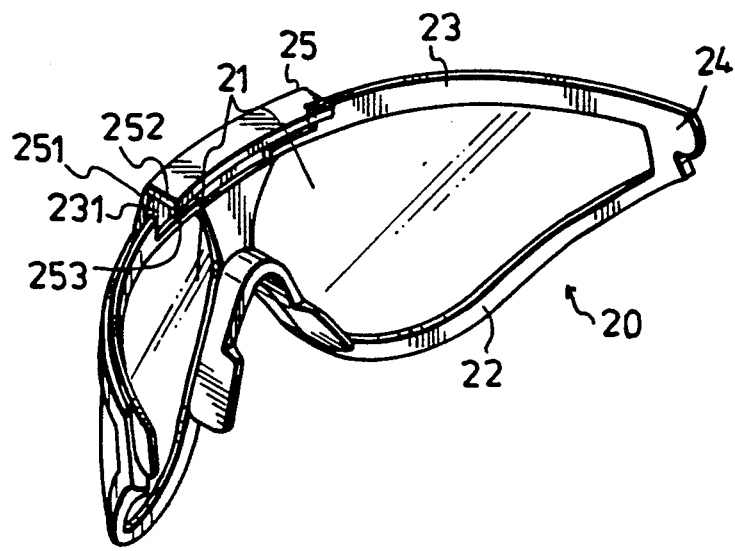
FIG. 3 is a perspective rear view showing the lens unit of the eyeglasses of this invention.
Figure 4:
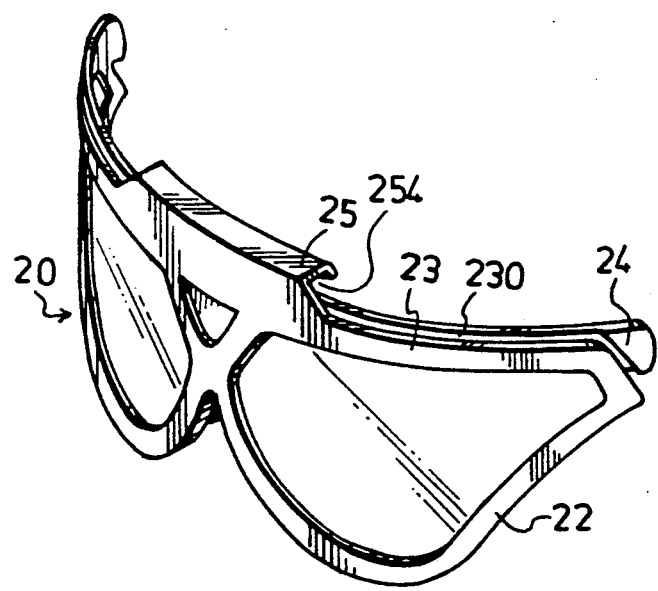
FIG. 4 is a perspective front view of the lens unit of the eyeglasses according to this invention.
Figure 5:
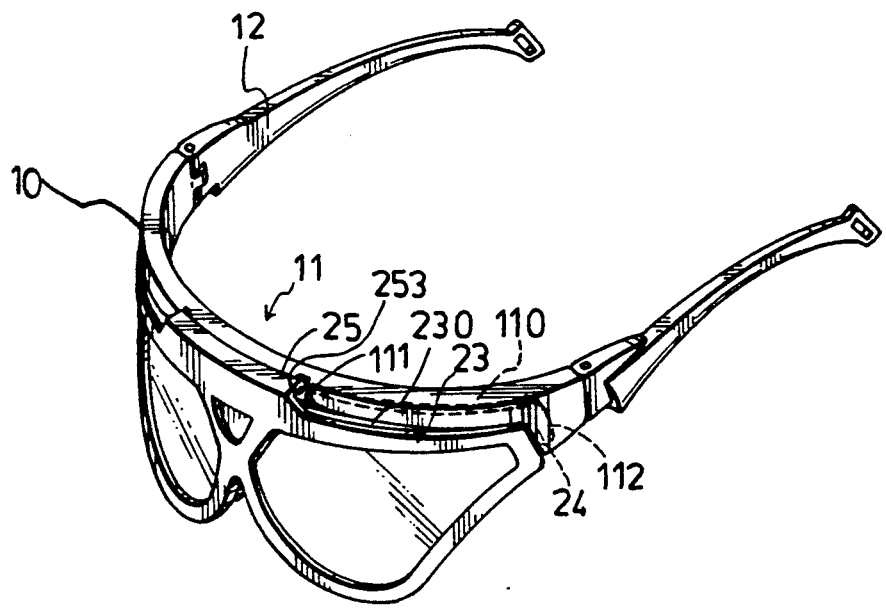
FIG. 5 is a schematic view illustrating how to remove the lens unit of this eyeglasses from the eyeglass frame of the eyeglasses according to this invention.

Referring to FIGS. 3 and 4, the lens unit (20) includes a pair of lenses (21) and a lens rim (22) mounted securely on the peripheral portions of the lenses (21). The lens rim (22) has an upwardly projecting rib (230) projecting upward from the upper end portion (23) thereof to engage the engagement groove (110) of the curved front frame (11) (see FIG. 5). A hook (25) is fixed on the intermediate section of the upper end portion (23) of the lens rim (22). The upwardly projecting rib (230) has two lugs (24) projecting respectively and outwardly from two ends thereof. Referring to FIG. 5, the lugs (24) are inserted into the end portions (112) of the engagement groove (110) of the curved front frame (11) of the eyeglass frame (10). The hook (25) includes a vertical plate portion (251) connected securely to the intermediate section of the lens rim (22) and spaced apart from the upwardly projecting rib (230). A horizontal plate portion (252) extends rearward from the upper end of the vertical plate portion (251). A retaining portion (253) extends downward from the rear end of the horizontal plate portion (252), so as to define a retaining space (254) in the hook (25), thus retaining the retained portion (111) of the curved front frame (11) of the eyeglass frame (10) in the retaining space (254) of the hook (25).

Referring to FIG. 5, in order to remove a mounted lens, the retaining portion (253) of the hook (25) is pushed upward away from the eyeglass frame (10) so as to remove the hook (25) from the retained portion (111) of the curved front frame (11) of the eyeglass frame (10). At this time, the lugs (24) of the upwardly projecting rib (230) can be disengaged from the end portions (112) of the engagement groove (110) of the curved front frame (11). Accordingly, the lens unit (20) of the eyeglasses (1) is capable of being easily replaced to satisfy different need of the wearer.

With this invention thus explained, it is apparent that numerous modifications and variations can be made without departing from the scope and spirit of this invention. It is thereof intended that this invention be limited only as indicated in the appended claims.

I claim:

1. A pair of eyeglasses comprising:

an eyeglass frame including a curved front frame with two downwardly projecting end portions, and a pair of bows which are respectively coupled with said end portions of said curved front frame, said curved front frame having an engagement groove formed in a bottom surface thereof, and a retained portion disposed at a middle section of said curved front frame, said engagement groove having two end portions respectively extending into front surfaces of said downwardly projecting end portions of said curved front frame; and a lens unit including a pair of lenses and a lens rim mounted securely on peripheral sections of said lenses, said lens rim being made of a plastic material and having an upwardly projecting rib projecting upward from an upper end portion thereof so as to engage said engagement groove of said curved front frame, and a hook fixed on an intermediate section of said lens rim, said upwardly projecting rib having two lugs projecting respectively and outwardly from two ends thereof for being inserted into said end portions of said engagement groove of said curved front frame of said eyeglass frame, said hook including a vertical plate portion connected securely to said intermediate section of said lens rim and spaced apart from said upwardly projecting rib, a horizontal plate portion extending rearward from an upper end of said vertical plate portion, and a retaining portion extending downward from a rear end of said horizontal plate portion, thereby defining a retaining space in said hook so as to retain said retained portion of said curved front frame of said eyeglass frame in said retaining space of said hook;

whereby, when said retaining portion of said hook is pushed upward away from said eyeglass frame so as to remove said hook from said retained portion of said curved front frame, said lugs of said upwardly projecting rib can be disengaged from said end portions of said engagement groove of said curved front frame.

* * * * *